United States Patent
Tsuchida et al.

(10) Patent No.: US 8,070,236 B2
(45) Date of Patent: Dec. 6, 2011

(54) VEHICULAR BRAKE HYDRAULIC PRESSURE CONTROL DEVICE

(75) Inventors: Tetsuo Tsuchida, Tomi (JP); Motoyasu Nakamura, Tomi (JP)

(73) Assignee: Nissin Kogyo Co., Ltd., Nagano (JP)

( * ) Notice: Subject to any disclaimer, the term of this patent is extended or adjusted under 35 U.S.C. 154(b) by 1071 days.

(21) Appl. No.: 11/694,371

(22) Filed: Mar. 30, 2007

(65) Prior Publication Data

US 2007/0228818 A1 Oct. 4, 2007

(30) Foreign Application Priority Data

Mar. 31, 2006 (JP) ................................. 2006-100946

(51) Int. Cl.
*B60T 13/00* (2006.01)
(52) U.S. Cl. ....................................... 303/9.64; 188/344
(58) Field of Classification Search ................ 303/9.64; 188/344, 349, 106 P
See application file for complete search history.

(56) References Cited

U.S. PATENT DOCUMENTS

| | | | |
|---|---|---|---|
| 6,007,161 A | | 12/1999 | Worsdorfer |
| 6,126,248 A | * | 10/2000 | Kawahata et al. ......... 303/114.1 |
| 6,273,523 B1 | | 8/2001 | Wakabayashi et al. |
| 6,543,859 B2 | | 4/2003 | Sakamoto |
| 6,733,089 B1 | * | 5/2004 | Wakabayashi et al. ...... 303/9.64 |
| 2002/0125764 A1 | | 9/2002 | Sakamoto |
| 2006/0082216 A1 | * | 4/2006 | Hamm et al. ................. 303/9.64 |
| 2006/0138858 A1 | * | 6/2006 | Nakayama et al. .......... 303/9.64 |
| 2007/0252430 A1 | * | 11/2007 | Nishikawa et al. ......... 303/113.4 |

FOREIGN PATENT DOCUMENTS

| | | |
|---|---|---|
| DE | 102005046146 | 8/2006 |
| DE | 102005052166 | 6/2007 |
| EP | 1481864 | 12/2004 |
| JP | 10-175533 | 6/1998 |
| JP | A-2000 6779 | 1/2000 |
| JP | 2000-062589 | 2/2000 |
| JP | 2000071963 | 3/2000 |
| JP | 2000-264278 | 9/2000 |
| JP | 2000-0302021 | 10/2000 |
| JP | A-2002 264787 | 9/2002 |
| JP | 3457190 | 8/2003 |
| JP | 2004-505835 | 2/2004 |
| JP | 2004-231112 | 8/2004 |
| WO | 2004/074060 | 9/2004 |

OTHER PUBLICATIONS

Office Action for corresponding Japanese Application No. 2006-100946.
European Search Report for corresponding European Patent Application No. EP 07 00 6689.

\* cited by examiner

*Primary Examiner* — Robert Siconolfi
*Assistant Examiner* — Anna Momper
(74) *Attorney, Agent, or Firm* — Andrew M. Calderon; Roberts Mlotkowski Safran & Cole, P.C.

(57) ABSTRACT

A vehicular brake hydraulic pressure control device has a first operation unit T1 including a first brake operation element; a first brake system K1 for braking a first wheel brake R corresponding to the first operation unit T1; and a first control valve unit A and B for controlling brake hydraulic pressure in the first brake system. In the device, the first operation unit T1 and the first brake system K1 are separated so as not to flow a brake fluid, and the device further comprises a brake fluid tank 30 having a reservoir function for supplying the brake fluid to the separated first brake system K1.

16 Claims, 3 Drawing Sheets

VEHICULAR BRAKE HYDRAULIC PRESSURE CONTROL DEVICE

BACKGROUND OF THE INVENTION

1. Field of the Invention

The present invention relates to a vehicular brake hydraulic pressure control device, and more particularly, to a vehicular brake hydraulic pressure control device mainly mountable for a bar handle type vehicle such as a motorcycle, a motor tricycle, an all terrain vehicle (ATV) and the like.

2. Description of Related Art

It has been conventionally known for a vehicular brake hydraulic pressure control device that the fluid pressure is increased by a pump so as to control braking force in an interlocking brake between front and rear wheels of a vehicle such as a motor cycle or the like (for example, refer to Japanese Patent Unexamined Publication JP-A-2000-6779).

Further, it has been also known for a vehicular brake hydraulic pressure control device that the fluid pressure is increased by a pump so as to control the braking force distribution to be near an ideal braking force distribution, in which the braking force distribution is in an interlocking brake between front and rear wheels of a vehicle such as a motor cycle or the like (for example, refer to Japanese Patent Examined Publication JP-B-3457190.

Further, a vehicular brake hydraulic pressure control device including a stroke simulator for giving operation reaction force to the brake operation element, in which the operation reaction force corresponds to the operation of a brake operation element, has been also known (for example, refer to JP-A-2002-264787).

The vehicular brake hydraulic pressure control device disclosed in JP-A-2002-264787 includes an electric brake hydraulic pressure control mode and a mechanical brake hydraulic pressure control mode. When the electric brake fluid control mode is executed, the stroke simulator is operated so as to give operation reaction force, which corresponds to the operation of the brake operation element, to the brake operation element. Further, when some troubles occur while executing the electric brake fluid control mode, constitution elements according to the electric brake fluid control mode are turned off. Then, the electric brake fluid control mode is transferred to the mechanical brake hydraulic pressure control mode, and the brake hydraulic pressure corresponding to a brake operation amount is directly supplied to a wheel cylinder. Accordingly, a fail-safe function can be realized in this device.

However, the above-described conventional vehicular brake hydraulic pressure control devices have a problem that a pulsation occurred by operating a pump may be transmitted to a brake operation element through a fluid passage at the time of operating ABS or an interlocking brake so as to damage operation feeling.

More particularly, in a vehicle such as a motorcycle or the like, when the operation of the front wheel side brake (the operation of an operation element such as a brake lever or the like) is additionally performed while a front wheel side brake is operated (the operation of an operation element such as a pedal or the like) interlocking with the operation of a rear wheel side brake, the pulsation by the pump is easily transmitted to a brake lever through a fluid passage communicating to the front wheel side brake.

Further, a general vehicular brake hydraulic pressure control device is needed to have a plurality of operation equipments to control a brake, so that the number of parts is increased so as to increase the size of the device. Therefore, improving the vehicular brake hydraulic pressure control device has been desired.

SUMMARY OF THE INVENTION

The present invention has an objective to provide a vehicular brake hydraulic pressure control device without transmitting the pulsation by a pump to a brake operation element, while decreasing the number of parts so as to decrease the size and decreasing a production cost.

In order to solve the above-described problems, according to a first aspect of the invention, there is provided a vehicular brake hydraulic pressure control device comprising:

first operation unit that is provided with a first brake operation element;

a first brake system that operates a first wheel brake in response to the first operation unit;

a first control valve unit that is provided at the first brake system and controls brake hydraulic pressure in the first brake system;

a second operation unit that is provided with a second brake operation element;

a second brake system that operates a second wheel brake in response to the second operation unit; and a second control valve unit that is provided at the second brake system and controls brake hydraulic pressure in the second brake system, wherein the first operation unit and the first brake system are separated so as not to flow brake fluid therebetween, and wherein a brake fluid tank having a reservoir function is provided for supplying the brake fluid to the separated first brake system.

According to this vehicular brake hydraulic pressure control device, the first operation unit and the first brake system are separated so as not to flow a brake fluid therebetween. Thus, even when pulsation from a member causing the pulsation occurs at the first brake system, the pulsation is not transmitted from the first brake system to the first operation unit. Therefore, while the interlocking brake or the like is operated so as to apply brake hydraulic pressure to the first wheel brake of the first brake system, when the first brake operation element of the first operation unit is operated, the pulsation is not transmitted to the brake operation element, and thus operation feeling of the first brake operation element is not damaged.

Further, the vehicular brake hydraulic pressure control device further includes the brake fluid tank having a reservoir function for supplying the brake fluid to the separated first brake system. So, the brake fluid is supplied from the brake fluid tank to the first brake system. When the pressure is decreased at the time of anti-lock brake controlling, the brake fluid is returned from the first wheel brake side to the brake fluid tank. Therefore, a reservoir, a suction valve or the like is not needed in the first brake system, and thus the number of parts is decreased so as to decrease the size of the device. Further, since the number of parts is decreased, a production cost is also decreased.

According to a second aspect of the invention, as set forth in the first aspect of the invention, it is preferable that the brake fluid tank is open to atmosphere.

In such the vehicular brake hydraulic pressure control device, the brake fluid tank is opened to the atmosphere. So, when the pressure is decreased at the time of anti-lock brake controlling, the brake fluid can be smoothly returned to the brake fluid tank from the first wheel brake side.

According to a third aspect of the invention, as set forth in the first aspect of the invention, it is preferable that the first operation unit corresponding to the first brake system comprises:

a master cylinder, and an output flow passage that outputs the brake fluid from the master cylinder, and wherein the output flow passage is directly connected to the first wheel brake system by a parallel system which is different from the first brake system.

In such the vehicular brake hydraulic pressure control device, the output flow passage from the master cylinder of the first operation unit is directly connected to the first wheel brake. So, even when an engine or the like is stopped or a control device or the like is stopped, breaking force can be given to the first wheel brake, and thus a fail safe function can be realized.

According to a fourth aspect of the invention, as set forth in the first aspect of the invention, it is preferable that the first operation unit corresponding to the first brake system comprises:

a stroke simulator that gives operation reaction force in response to the operation of the first brake operation element to the first brake operation element; and a detection unit that detects an operation amount of the first brake operation element, and wherein the first brake system comprises a pump that discharges the brake fluid to at least a first wheel hydraulic pressure passage communicating to the first wheel brake in order to correspond to the operation amount detected by the detection unit.

According to this vehicular brake hydraulic pressure control device, the detection unit detects an operation amount of the first brake operation element, the pump is operated corresponding to the operation amount detected by the detection units, and the brake fluid is discharged to at least the first wheel hydraulic pressure passage communicating to the first wheel brake. Therefore, although the first operation unit and the first brake system are separated so as not to flow the brake fluid, the operation amount of the brake operation element in the first operation unit can correspond to the brake hydraulic pressure controlled by the first brake system.

According to a fifth aspect of the invention, as set forth in the fourth aspect of the invention, it is preferable that the brake fluid returned to a suction hydraulic pressure passage of the pump from the first wheel brake flows into the brake fluid tank.

According to this vehicular brake hydraulic pressure control device, even when the brake fluid is frequently returned to the suction hydraulic pressure passage side of the pump at the time of anti-lock brake controlling, the brake fluid can be returned to the brake fluid tank, and the brake hydraulic pressure can be smoothly decreased. Therefore, the brake hydraulic pressure can be stably controlled.

According to a sixth aspect of the invention, as set forth in the fourth aspect of the invention, it is preferable that the first control valve unit comprises:

a first control member corresponding to the first wheel brake; and a second control member corresponding to the second wheel brake, wherein the first control member and the second control member communicate or shut off a first wheel hydraulic pressure passage communicating to the first wheel brake and a second wheel hydraulic pressure passage communicating to the second wheel brake to increase and retain the brake hydraulic pressure to the first and second wheel brakes, and returns the brake fluid in the respective first and second wheel hydraulic pressure passages to the suction hydraulic pressure passage of the pump to decrease the brake hydraulic pressure.

According to this vehicular brake hydraulic pressure control device, the first brake system can realize controlling an interlocking brake for controlling the brake hydraulic pressure with respect to the first and second wheel brakes, as well as the anti-lock brake control to the wheel brakes.

According to a seventh aspect of the invention, as set forth in the fourth aspect of the invention, it is preferable that the second brake system comprises:

a master cylinder;

a cut valve that communicates or shuts off between the master cylinder and the second control valve unit; and a suction valve that communicates or shuts off between the master cylinder and the suction hydraulic pressure passage of the pump.

According to this vehicular brake hydraulic pressure control device, the cut valve shuts off the master cylinder and the second control valve unit, and the suction valve communicates the master cylinder and the suction hydraulic pressure passage of a pump, and thereby the brake hydraulic pressure can be controlled so as to be increased in the second brake system. Therefore, in the both brake systems, the brake hydraulic pressure can be controlled so as to be increased, and any one of brake inputting by the first and second operation unit can execute the interlocking brake.

According to eighth and ninth aspects of the invention, as set forth in the first aspect of the invention, it is preferable that the second wheel brake may be operated by an input of the brake fluid from the first brake system and the second brake system, respectively, or the first wheel brake may be operated by an input of the brake fluid from the first brake system and the second brake system, respectively.

According to this vehicular brake hydraulic pressure control device, any one of brake inputting by the first and second operation unit can execute the interlocking brake. Further, brake cylinders in the first wheel brake and the second wheel brake are provided for every brake system, so that brake controlling can be performed based on the brake hydraulic pressure from each brake system to the first and second wheel brakes, and braking responsibility can be improved. Thereby, the rise-up of the wheel brake at initial braking can be improved, and braking force can be hastily risen up at the time of a sudden breaking operation, and thus the sudden braking can be effectively and accuracy performed.

Further, the brake cylinders in the first wheel brake and the second wheel brake are provided for respective brake system, so as to prevent that the brake hydraulic pressures of the first brake system and the second brake system interference in the brake cylinders. Therefore, for example, while the second wheel brake is operated interlocking with the first brake system, even when the second brake operation element is additionally operated to the second brake system, transmitting the pulsation of a member causing the pulsation to the second brake operation element can be prevented. Thereby, damaging the operation feeling can be prevented.

According to tenth and eleventh aspect of the invention, as set forth in the first aspect of the invention, it is preferable that the first brake system is for a rear wheel side, and the second brake system is for a front wheel side, or the first brake system is for a front wheel side, and the second brake system is for a rear wheel side.

According to this vehicular brake hydraulic pressure control device, the constitution in which the first operation unit and the first brake system are separated so as not to flow the brake fluid therebetween can be applied to the rear wheel side and also applied to the front wheel side.

According to the vehicular brake hydraulic pressure control device of the present invention, the pulsation by the pump is not transmitted to a brake operation element, and the number of parts can be decreased so as to decrease the device size.

DETAILED DESCRIPTION OF EXEMPLARY EMBODIMENTS OF THE INVENTION EMBODIMENTS

Hereinafter, the best mode for performing the present invention will be concretely described with attached drawings. In addition, the same numerals are used to the same elements so as to omit overlapping descriptions.

Figure 1:
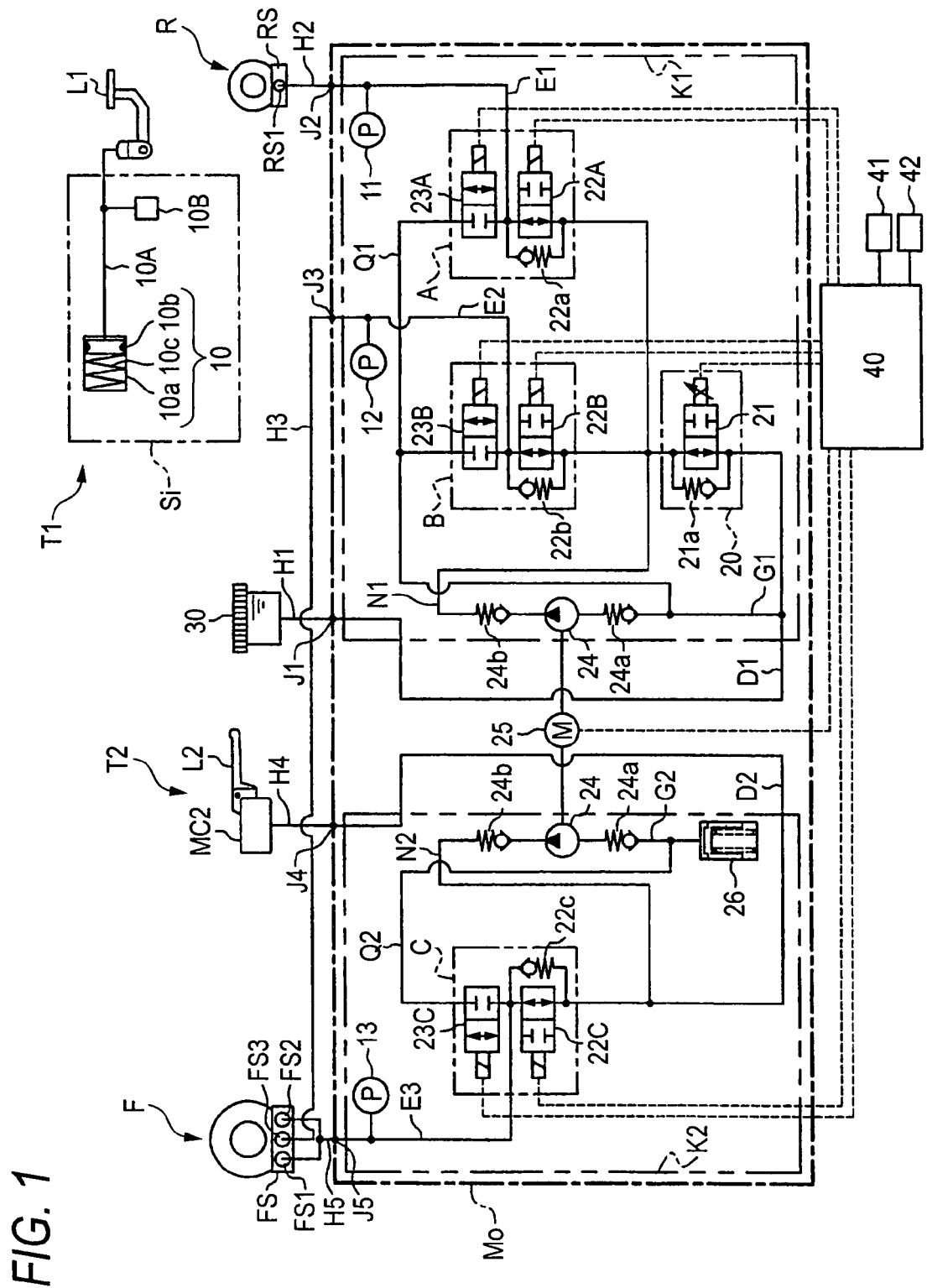
FIG. 1 is a view of a brake hydraulic pressure circuit applied to a vehicular brake hydraulic pressure control device according to the first embodiment of the present invention.

In the referring drawings, FIG. 1 is a view of a brake hydraulic pressure circuit applied to a vehicular brake hydraulic pressure control device according to the first embodiment of the present invention.

As illustrated in FIG. 1, a vehicular brake hydraulic pressure control device (hereinafter, a brake control device) U is preferably used for a bar handle type vehicle such as a motorcycle, a motor-tricycle, an all terrain vehicle (ATV) and the like. The brake control device U includes the first and second brake systems K1 and K2, which are independent each other. In the device U, by properly controlling a braking force applied to a wheel brake F mounted on a front wheel and a braking force applied to a wheel brake R mounted on a rear wheel via a control device 40, anti-lock brakes of the independent wheel brakes F or R can be controlled, and an interlocking brake for interlocking the two wheel brakes F and R can be controlled. In the following descriptions, a first brake system K1 will be described as a rear wheel side brake system, and a second brake system K2 will be described as a front wheel side brake system.

The first brake system K1 controls the rear wheel brake R in accordance with a first operation unit T1 provided with a brake pedal L1 as a first brake operation element, and also controls the front wheel brake F interlocking with the rear wheel. The first brake system K1 is configured such that the first operation unit T1 is separated from the first brake system K1 so that brake fluid in the first brake system K1 does not flow into the first operation unit T1. More particularly, detection unit electrically detects a brake input (an operation amount) from the brake pedal L1, and the control device 40 controls an operation of each equipment of the first brake system K1 based on the operation amount detected by the detection unit so as to control brake hydraulic pressure.

Further, the second brake system K2 mainly controls the front wheel brake F in accordance with a second operation unit T2 provided with a brake lever L2 as a second brake operation element. More particularly, a master cylinder MC2 is operated based on a brake input from the brake lever L2, and brake hydraulic pressure from the master cylinder MC2 is directly inputted to the second brake system K2.

In this embodiment, the rear wheel brake R employs a brake cylinder RS having one cylinder RS1. Further, the front wheel brake F employs a brake cylinder FS having three cylinders FS1 to FS3. The front wheel brake F mainly inputs a brake fluid from the second brake system K2 to the cylinders FS1 and FS2, and also inputs the brake fluid from the first brake system K1 to the cylinder F3 as a sub input. That is, by operating the rear wheel brake pedal L1, the interlocking brake between the rear wheel and the front wheel is controlled based on the second brake system K2.

Hereinafter, a fluid pressure circuit illustrated in FIG. 1 will be concretely described.

The first brake system K1 is for controlling the rear wheel as described above, and includes a flow passage from an inlet port J1 communicating to a brake fluid tank 30 to an outlet port J2 and a flow passage from the inlet port J1 to an outlet port J3. The outlet port J2 is connected to the rear wheel brake R through a pipe H2, and the outlet port J3 is connected to the front wheel brake F through a pipe H3.

On the other hand, the second brake system K2 is for controlling the front wheel as described above, and includes a flow passage from an inlet port J4 to an outlet port J5. The inlet port J4 is connected to the master cylinder MC2, which a source of fluid pressure, through a pipe H4, and the outlet port J5 is connected to the front wheel brake F through a pipe H5.

In addition, the master cylinder MC2 includes a cylinder connected to a brake fluid tank chamber for storing brake fluid, and a rod piston (not illustrated), which slides in an axial direction of the cylinder by the operation of the brake lever L2 so as to flow out the brake fluid, is assembled in the cylinder.

A stroke simulator Si provided corresponding to the first brake system K1 is for quasi-applying operation reaction force to the brake pedal L1 in accordance with the operation amount or the operation force of the brake pedal L1.

The stroke simulator Si includes a dummy cylinder 10 having: a cylinder body 10a; a piston 10b, which is slidably provided in the cylinder body 10a and is pushed by the brake pedal L1; and a spring 10c. Wherein the brake pedal L1 and the piston 10b are connected by a rod 10A, and when the brake pedal L1 is stepped, reaction force and stroke corresponding to a pedal operation amount are applied to the brake pedal L1 by spring force from the spring 10c.

The rod 10A includes a detection sensor 10B for detecting an operation amount of the brake pedal L1. As the detection sensor 10B, for example, a stroke sensor, a load sensor or the like can be used. The detection sensor 10B detects an operation amount or operation force of the brake pedal L1. A detection signal from the detection sensor 10B is inputted in the control device 40.

The first brake system K1 will be described. The first brake system K1 includes rear wheel control valve unit A (a first control member) and front wheel interlocking control valve unit B (a second control member) as first control valve unit. The first brake system K1 mainly includes a regulator 20, a first hydraulic pressure sensor 11, a second hydraulic pressure sensor 12, and a pump 24.

In addition, in the following descriptions, flow passages (oil passages) are determined as follows:

a flow passage from the inlet port J1 to the regulator 20 will be called as an output hydraulic pressure passage D1;

a flow passage from the regulator 20 to the wheel brake R will be called as "a wheel hydraulic pressure passage E1" (a first wheel hydraulic pressure passage);

a flow passage from the regulator 20 to the wheel brake F will be called as "a wheel hydraulic pressure passage E2" (a second wheel hydraulic pressure passage);

a flow passage from the output hydraulic pressure passage D1 to the pump 24 will be called as "a suction hydraulic pressure passage G1";

a flow passage from the pump 24 to the wheel hydraulic pressure passage E1 will be called as "a discharge hydraulic pressure passage N1"; and a flow passage from the wheel hydraulic pressure passage E1 to the suction hydraulic pressure passage G1 will be called as "a release passage Q1".

The regulator 20 includes:

a function for switching the states of allowing and shutting off flowing of brake fluid from the output hydraulic pressure passage D1 to the wheel hydraulic pressure passages E1 and E2; and a function for adjusting the brake hydraulic pressures in the wheel hydraulic pressure passages E1 and E2 and the discharge hydraulic pressure passage N1 to a predetermined value or less when the flowing of the brake fluid into the wheel hydraulic pressure passages E1 and E2 is shut-off from the output hydraulic pressure passage D1.

Further, the regulator 20 includes a cut valve 21 and a check valve 21a.

The cut valve 21 is a normally open type linear solenoid valve provided between the output hydraulic pressure passage D1 and the wheel hydraulic pressure passages E1 and E2. The cut valve 21 is for switching the states of allowing and shutting off flowing of the brake fluid from the output hydraulic pressure passage D1 to the wheel hydraulic pressure passages E1 and E2. That is, the cut valve 21 can adjust valve opening pressure by controlling the current flow of the solenoid. In a normal state, the cut valve 21 is opened so as to allow returning (circulate) the brake fluid, which is discharged from the pump 24 to the discharge hydraulic pressure passage N1 and flows into the wheel hydraulic pressure passages E1 and E2, to the suction hydraulic pressure passage G1. Further, when the brake pedal L1 is operated, (that is, the brake hydraulic pressure is applied to the wheel brake R), the cut valve 21 is closed by controlling of the control device 40. Further, the cut valve 21 can adjust the brake hydraulic pressure by properly releasing the brake hydraulic pressures in the wheel pressure passages E1 and E2 to the suction hydraulic pressure passage G1, by balancing the brake hydraulic pressure applied from the output hydraulic pressure passage D1 to the regulator 20 and the force to close the valve controlled by the current carried to the solenoid.

The check valve 21a is connected in parallel with the cut valve 21. The check valve 21a is a one-way valve which allows flowing the brake fluid from the output hydraulic pressure passage D1 to the wheel hydraulic pressure passages E1 and E2.

The rear wheel control valve unit A has a function for changing:

the state of shutting off the release passage Q1 while releasing the wheel hydraulic pressure passage E1;

the state of releasing the release passage Q1 while shutting off the wheel hydraulic pressure passage E1; and the state of shutting off both of the wheel hydraulic pressure passage E1 and the release passage Q1.

The rear wheel control valve unit A includes an inlet valve 22A, a check valve 22a, and an outlet valve 23A.

The inlet valve 22A is a normally open type electromagnetic valve provided at the wheel hydraulic pressure passage E1. In the normal state, the inlet valve 22A opens so as to allow transmitting brake hydraulic pressure from the pump 24 to the wheel brake R through the wheel hydraulic pressure passage E1. Further, the inlet valve 22A is closed by controlling of the control device 40 when the rear wheel is falling into locking state, so as to shut-off transmitting the brake hydraulic pressure from the pump 24 to the wheel brake R through the wheel hydraulic pressure passage E1.

The outlet valve 23A is a normally close type electromagnetic valve provided between the wheel hydraulic pressure passage E1 and the release passage Q1. When the rear wheel is falling into locking state, although the outlet valve 23A is normally closed, the outlet valve 23A is opened by controlling of the control device 40 so as to release the brake hydraulic pressure which applies to the wheel brake R to the suction hydraulic pressure passage G1 from the release passage Q1. Thereby, the brake fluid released to the suction hydraulic pressure passage G1 is returned to the brake fluid tank 30.

The check valve 22a is connected in parallel with the inlet valve 22A. The check valve 22a is for allowing flowing only the brake fluid from the wheel brake R side into the regulator 20 side. When inputting from the brake pedal L1 is released, the check valve 22a allows flowing the brake fluid from the wheel brake R side into the regulator 20 side even while closing the inlet valve 22A.

The front wheel interlocking control valve unit B is for controlling the brake hydraulic pressure of the front wheel brake F while interlocking mainly based on the operation of the brake pedal L1.

The front wheel interlocking control valve unit B includes a function for switching:

the state of shutting off the release passage Q1 while releasing the wheel hydraulic pressure passage E2 (the second wheel hydraulic pressure passage);

the state of releasing the release passage Q1 while shutting off the wheel hydraulic pressure passage E2; and the state of shutting off the release passage Q1 while shutting off the wheel hydraulic pressure passage E2.

The front wheel interlocking control valve unit B includes an inlet valve 22B, an outlet valve 23B, and a check valve 22b.

The inlet valve 22B is a normally open type electromagnetic valve provided at the wheel hydraulic pressure passage E2. In a normal state, the inlet valve 22B opens so as to allow transmitting the brake fluid from the pump 24 to the wheel brake F through the wheel hydraulic pressure passage E2. Further, when the front wheel is falling into the locking state, the inlet valve 22B is closed by controlling of the control device 40 so as to shut-off transmitting the brake fluid from the pump 24 to the wheel brake F through the wheel hydraulic pressure passage E2.

The outlet valve 23B is a normally close type electromagnetic valve between the wheel hydraulic pressure passage E2 and the release passage Q1. When the front wheel is falling into the locking state, although the outlet valve 23B is normally closed, the outlet valve 23B is opened by controlling of the control device 40 so as to release brake fluid which applies to the wheel brake F to the suction hydraulic pressure passage G1 through the release passage Q1. Thereby, the brake fluid released to the suction hydraulic pressure passage G1 is returned to the brake fluid tank 30.

The check valve 22b is connected in parallel with the inlet valve 22B. The check valve 22b is for allowing flowing only the brake fluid from wheel brake F side into the regulator 20 side. When inputting from the brake pedal L1 or the like is released, the check valve 22b allows flowing the brake fluid from wheel brake F side into the regulator 20 side even while closing the inlet valve 22B.

The first hydraulic pressure sensor 11 is for measuring the magnitude of brake hydraulic pressure working on the wheel brake R, and is provided at the wheel hydraulic pressure passage E1. The value of brake hydraulic pressure measured by the first hydraulic pressure sensor 11 is taken into the control device 40 as needed. The control device 40 compares whether the magnitude of the brake fluid measured by the first hydraulic pressure sensor 11 corresponds to the operation amount or the operation force measured by the detection sensor 10B of the stroke simulator Si or not. Then, the control device 40 controls the rear wheel control valve unit A and the front wheel interlocking control valve unit B so as to correspond the value measured by the first hydraulic pressure sensor 11 to the value measured by the detection sensor 10B.

The second hydraulic pressure sensor 12 is for measuring the magnitude of brake fluid working on the wheel brake F, and is provided at the wheel hydraulic pressure passage E2. The value of the brake fluid measured by the second hydraulic pressure sensor 12 is taken into the control device 40 as needed so as to control an interlocking brake or the like. That is, the control device 40 compares whether the magnitude of the brake fluid measured by the second hydraulic pressure sensor 12 corresponds to the operation amount or the operation force measured by the detection sensor 10B of the stroke simulator Si or not. Then, the control device controls the front wheel interlocking control valve unit B so that the value measured by the second hydraulic pressure sensor 12 correspond to the value measured by the detection sensor 10B. In addition, the control device 40 includes a map or the like (not illustrated) in which the ratio of brake braking forces of the front wheel and the rear wheel in the interlocking brake is determined. The control device 40 obtains the ratio of the brake braking forces of the front and rear wheels based on various status amounts showing the running state or the like of a vehicle by using the map, and controls the rear wheel control valve unit A and the front wheel interlocking control valve unit B based on the obtained ratio.

The pump 24 includes a suction valve 24a on the sucking side and a discharge valve 24b on the discharging side, and is provided between the suction hydraulic pressure passage G1 and the discharge hydraulic pressure passage N1. The pump 24 is driven by rotation force of a motor 25 so as to suck a brake fluid from the suction hydraulic pressure passage G1 and discharge it to the discharge hydraulic pressure passage N1. Further, when the cut valve 21 closes, the pump 24 sucks a brake fluid stored in the brake fluid tank 30 and discharges it to the discharge hydraulic pressure passage N1. Thereby, the brake fluid is returned to the brake fluid tank 30 so as to restore the pressure state of the wheel hydraulic pressure passage E1 where the pressure is decreased. Further, the brake hydraulic pressure can be increased to the wheel brake R based on the operation of the brake pedal L1 or the operation of the interlocking brake.

The motor 25 is a common power source of the pump 24 in the first brake system K1 and the pump 24 in the second brake system K2, and is operated based on commands by the control device 40.

The brake fluid tank 30 is an atmosphere-opening tank (that is, the brake fluid tank 30 is open to atmosphere). In addition, the brake fluid tank 30 stores an enough amount of a brake fluid to be used for increasing the pressure in the first brake system K1.

The brake system K2 will be described. In the following descriptions, flow passages are determined as follows:

a flow passage from the inlet port J4 to the control valve unit C will be called as "an output hydraulic pressure passage D2", a flow passage from the control valve unit C to the outlet port J5 will be called as "a wheel hydraulic pressure passage E3", a flow passage from the wheel hydraulic pressure passage E3 to the pump 24 will be called as "a releasing passage Q2", a flow passage from the releasing passage Q2 to the pump 24 will be called as "a suction hydraulic pressure passage G2", and a flow passage from the pump 24 to the wheel hydraulic pressure passage E3 will be called as "a discharge hydraulic pressure passage N2".

The second brake system K2 includes front wheel control valve unit C (including an inlet valve 22C and an outlet valve 23C) as second control valve unit, a pump 24, a reservoir 26, and a third hydraulic pressure sensor 13.

The front wheel control valve C includes a function for switching:

the state of shutting off the releasing passage Q2 while releasing the wheel hydraulic pressure passage E3, the state of releasing the releasing passage Q2 while shutting off the wheel hydraulic pressure passage E3, and the state of shutting off both of the wheel hydraulic pressure passage E3 and the releasing passage Q2.

The front wheel control valve unit C also includes an inlet valve 22C, a check valve 22c, and an outlet valve 23C.

The inlet valve 22C is a normally open type electromagnetic valve and provided at the wheel hydraulic pressure passage E3. In the normal state, the inlet valve 22C opens so as to allow transmitting brake hydraulic pressure from the master cylinder MC2 to the wheel brake F. Further, when the front wheel is falling into the locking state, the inlet valve 22C is closed by controlling of the control device 40 so as to shut-off transmitting the brake hydraulic pressure from the master cylinder MC2 to the wheel brake F.

The outlet valve 23C is a normally close type electromagnetic valve, and provided between the wheel hydraulic pressure passage E3 and the releasing passage Q2. When the front wheel is falling into the locking state, although the outlet valve 23C is normally closed, the outlet valve 23C is opened by controlling of the control device 40, so as to release a brake fluid which works on the wheel brake F to the suction hydraulic pressure passage G2 through the releasing passage Q2. Thereby, the brake fluid is released to the suction hydraulic pressure passage G2 so as to flow into the reservoir 26.

The check valve 22c is connected in parallel with the inlet valve 22C. The check valve 22c is for allowing flowing only a brake fluid from the wheel brake F side to the master cylinder MC2 side. The check valve 22c allows flowing the brake fluid from the wheel brake F side to the master cylinder MC2 side even while closing the inlet valve 22C.

The pump 24 is driven by rotation force of the pump 24, and sucks the brake fluid from the suction hydraulic pressure passage G2 (the reservoir 26) and discharges it to the discharge hydraulic pressure passage N2.

The reservoir 26 is provided at the releasing passage Q2, and includes a function for temporarily storing the brake fluid released by opening the outlet valve 23C. The brake fluid stored in the reservoir 26 is sucked by the pump 24 at the time of increasing the pressure of the wheel brake F or the like.

The third hydraulic pressure sensor 13 is for measuring the magnitude of the brake hydraulic pressure working on the wheel brake F through the second brake system K2, and provided at the wheel hydraulic pressure passage E3. The value of the brake hydraulic pressure measured by the second hydraulic pressure sensor 12 is taken into the control device 40 as needed.

The control device 40 inputs values measured by the detection sensor 10B, the first hydraulic pressure sensor 11, the second hydraulic pressure sensor 12 and the third hydraulic pressure sensor 13, and controls the operation of various equipments of the first and second brake systems K1 and K2 based on outputting from a front wheel speed sensor 41 and a rear wheel speed sensor 42, where the front wheel speed sensor 41 is fixed and provided facing the side face of a pulsar gear (not illustrated) fixed at the front wheel, and the rear wheel speed sensor 42 is fixed and provided facing the side face of a pulsar gear (not illustrated) fixed at the rear wheel.

A normal brake controlling (an interlocking brake controlling) and an anti-lock brake controlling, which are realized by the control device 40, will be described.

(Normal Brake)

In the any states that an engine or motor (not illustrated) are not operated and those are operated, the flow passage from the master cylinder MC2 to the wheel brake F in the front wheel side second brake system K2 is opened through the output hydraulic pressure passage D2. Thereby, when the brake lever L2 is operated, brake hydraulic pressure works on two cylinders FS1 and FS2 of the brake cylinder FS of the wheel brake F through the output hydraulic pressure passage D2, the inlet valve 22C and the wheel hydraulic pressure passage E3. Thus, the front wheel side brake can be braked by operating the brake lever L2.

On the other hand, the rear wheel side first brake system performs brake control of the rear wheel interlocking with the front wheel at the time of normal braking, where the braking control of the rear wheel is mainly performed.

In this case, when the brake pedal L1 is not operated and the first brake system K1 does not perform the brake control, the inlet valve 22A is in a closed state.

Further, when the brake pedal L1 is operated, an operation amount of the brake pedal L1 is detected by the detection sensor 10B, and the detection signal is inputted into the control device 40 so as to drive the pump 24. The pump 24 discharges a brake fluid to the discharge hydraulic pressure passage N1, and the discharged brake fluid is adjusted to have a predetermined fluid pressure through the cut valve 21 of the regulator 20, so as to control the front and rear wheel brakes F and R through from the output hydraulic pressure passage D1 to the wheel hydraulic pressure passages E1 and E2.

When the normal brake controlling, at which each wheel cannot be locked, is performed, the cut valve 21 closes, and the inlet valves 22A and 22B open. Thereby, the brake fluid in the brake fluid tank 30 is sucked to the pump 24 from the output hydraulic pressure passage D1 through the suction hydraulic pressure passage G1, and discharged to the discharge hydraulic pressure passage N1 from the pump 24. Further, the brake fluid is fed to the wheel brake R through the inlet valve 22A of the wheel hydraulic pressure passage E1, and is fed to the wheel brake F through the inlet valve 22B of the wheel hydraulic pressure passage E2. This state is kept mainly until the control device 40 determines that the value measured by the first hydraulic pressure sensor 11 corresponds to the value detected by the detection sensor 10B. In addition, in this case, the control device 40 may control the interlocking brake by considering the valve measured by the second hydraulic pressure sensor 12, and may brake only the rear wheel side.

In this case, at the time of the interlocking brake, the brake fluid fed from the first brake system K1 to the front wheel side wheel brake F is fed to the one cylinder FS3 among three cylinders FS1 to FS3 of the brake cylinder FS. Further, in this embodiment, the cylinder FS3 has a smaller diameter (not illustrated) than the cylinders FS1 and FS2, so that generated braking force of the cylinder FS3 is lower than the cylinders FS1 and FS2. Thus, the front wheel side braking force at the time of the interlocking brake is set to be lower than that at the time of braking only the front wheel side. In addition, by changing the diameter of the cylinder FS3, magnitude of the braking force working on the wheel brake F at the time of the interlocking brake can be properly changed.

Further, as for the font wheel side brake cylinder FS, the three cylinders FS1 to FS3 are independently each other, thus, the brake fluid does not flow between the cylinder FS3 corresponding to the first brake system K1 and the cylinders FS1 and FS2 corresponding to the second brake system K2. Thereby, for example, when the front wheel side is additionally braked by the second brake system K2 by operating the brake lever L2 while performing the interlocking brake by the first brake system K1, the pulsation occurred by operating the pump 24 is not transmitted to the brake lever L2 through the flow passage. Therefore, at the time of interlocking braking, preferable operation feeling of the brake lever L2 can be obtained.

In addition, when the brake pedal L1 is loosened or the operation is finished, the brake fluid flowing to the wheel hydraulic pressure passages E1 and E2 is released from the release passage Q1 to the suction hydraulic pressure passage G1 through the outlet valves 23A and 23B, and returned to the brake fluid tank 30. In the following descriptions, the rear wheel control valve unit A, the front wheel interlocking control valve unit B, and the font wheel control valve unit C are similar constitutions, so that each brake control will be described using the rear wheel control valve unit A as an example.

Further, when the control device 40 determines that braking force needs to work on the rear wheel while braking the wheel brake F by operating the brake lever L2 of the front wheel side second brake system K2, the interlocking brake control can be performed. In this case, the rear wheel control valve unit A and the front wheel interlocking control valve unit B are properly controlled based on the value measured by the third hydraulic pressure sensor 13 in the second brake system K2.

(Anti-Lock Brake Controlling)

An anti-locking brake controlling is performed when the wheel is falling into the locking state. The anti-locking brake controlling is performed by controlling the rear wheel control valve unit A, the front wheel interlocking control valve unit B, and the front wheel control valve unit C respectively, which correspond to the wheel brakes F and R of which wheel is failing into locking state. Then, the state of brake hydraulic pressure working on the wheel brakes F and R is properly chosen to increase, decrease, or keep constantly. In addition, this choosing of the state of the brake hydraulic pressure to increase, decrease, or keep constantly is determined by the control device 40 based on the wheel speed obtained by front wheel speed sensor 41 and the rear wheel speed sensor 42.

Further, for example, when the control device 40 determines that the brake hydraulic pressure working on the rear wheel brake R needs to decrease, the rear wheel control valve unit A shuts off the wheel hydraulic pressure passage E1, and releases the release passage Q1. More particularly, the control device 40 excites the inlet valve 22A to close and excites the outlet valve 23A to open. Thus, the brake fluid in the wheel hydraulic pressure passage E1 communicating to the wheel brake R flows into the brake fluid tank 30 through the release passage Q1, and thus the brake hydraulic pressure working on the front wheel brake R is decreased.

When the control device 40 determines that the brake hydraulic pressure working on the rear wheel brake R needs to keep constantly, the rear wheel control valve unit A shuts off the wheel hydraulic pressure passage E1 and the release passage Q1. More particularly, the control device 40 excites the inlet valve 22A to close and demagnetizes the outlet valve 23A to close. Thereby, the brake fluid is kept in the closed flow passage by the wheel brake R, the inlet valve 22A, and the outlet valve 23A, and thus the brake hydraulic pressure working on the wheel brake R is constantly kept.

When the control device 40 determines that the brake hydraulic pressure working on the rear wheel brake R needs to increase, the rear wheel control valve unit A releases the wheel hydraulic pressure passage E1, and shuts off the release passage Q1. More particularly, the control device 40 demagnetizes the inlet valve 22A to open and demagnetizes the outlet valve 23A to close. Thereby, the brake fluid flowing to the wheel hydraulic pressure passage E1 from the discharge hydraulic pressure passage N1 by operating the pump 24 works on the wheel brake R through the inlet valve 22A, so as to increase the brake hydraulic pressure.

In addition, when the value of the brake hydraulic pressure of the wheel hydraulic pressure passage E1 is a predetermined value or more, the cut valve 21 releases the brake fluid in the wheel hydraulic pressure passage E1 to the suction hydraulic pressure passage G1, and thus excess working of the brake hydraulic pressure on the wheel brake R can be prevented.

The above-described interlocking brake controlling is continuously performed by operating the brake pedal L1. However, the present invention is not restricted in this constitution. For example, the interlocking brake controlling can be performed in the case that when a driver operates the brake pedal L1 to brake the rear wheel, the control device determines that braking force also needs to work on the front wheel because of the status amount of the vehicle based on the detection signal inputted from the detection sensor 10B into the control device 40.

In this case, for example, the control device 40 sets an target pressure value of the brake hydraulic pressure discharged from the control valve unit B based on the pressure value measured by the first hydraulic pressure sensor 11, measures the pressure value using the second hydraulic pressure sensor 12, and controls the operation of the control valve unit B. In this configuration, until the pressure valve measured by the second hydraulic pressure sensor 12 reaches to the target pressure value, the inlet valve 22B of the control valve unit B opens so as to flow the brake fluid in the brake fluid tank 30 into the discharge hydraulic pressure passage N1 through the pump 24. Thereby, the front wheel brake F can be automatically operated as the interlocking brake.

According to the above-described brake hydraulic pressure control device, the first operation unit T1 and the first brake system K1 are separated so as not to flow the brake fluid. Thus, when the pulsation is occurred at the wheel hydraulic pressure passage E1 by operating the pump 24, the pulsation is not transmitted from the first brake system K1 to the first operation unit T1.

Therefore, for example, when the rear wheel brake pedal L1 is additionally stepped so as to perform brake inputting while the rear wheel side wheel brake R is controlled to be braked by interlocking due to the operation of the front wheel side brake lever L2, the pulsation by operating the pump 24 is not transmitted to the brake pedal L1, so that an operation feeling of the brake pedal L1 is not damaged.

Further, the first brake system K1 includes the brake fluid tank 30 having a reservoir function for supplying a brake fluid to the separated first brake system K1. Thus, the brake fluid is supplied from the brake fluid tank 30 to the first brake system K1. Further, when the pressure is decreased at the time of the anti-lock brake controlling, the brake fluid is returned from the wheel brake R or the like to the brake fluid tank 30. Therefore, the first brake system K1 does not necessarily include a reservoir, a suction valve and the like, and thus the number of parts is decreased so as to decrease the size of the device. Further, since the number of parts is decreased, the production cost can be decreased.

Further, the brake fluid tank 30 is opened to the atmosphere. Thus, when the pressure is decreased at the time of the anti-lock brake controlling, the brake fluid can be smoothly returned from the wheel brake R or the like to the brake fluid tank 30.

Further, the first operation element T1 includes the detection sensor 10B for detecting an operation amount of the brake pedal L1, and controls the rear wheel control valve unit A and the front wheel interlocking control valve unit B so as to correspond the value measured by the first hydraulic pressure sensor 11 of the first brake system K1 to the value measured by the detection sensor 10B. Thus, although the first operation unit T1 and the first brake system K1 are separated so as not flow the brake fluid therebetween, the operation amount of the brake pedal L1 in the first operation unit T1 can be completely reflected to brake hydraulic pressure controlled by the first brake system K1.

Further, even when the brake fluid is frequently returned to the suction hydraulic pressure passage G1 side of the pump 24 when the pressure is decreased at the time of an anti-lock brake controlling, the brake fluid can be returned to the brake fluid tank 30, and the brake hydraulic pressure can be smoothly decreased. Therefore, the brake hydraulic pressure can be stably controlled.

Further, the first brake system K1 includes the rear wheel control valve unit A for controlling the rear wheel side wheel brake R, and the front wheel interlocking control valve unit B for controlling the front wheel side wheel brake F. Thus, the first brake system K1 can control the interlocking brake of the front wheel side wheel brake F while interlocking with braking of the rear wheel side wheel brake R.

Figure 2:
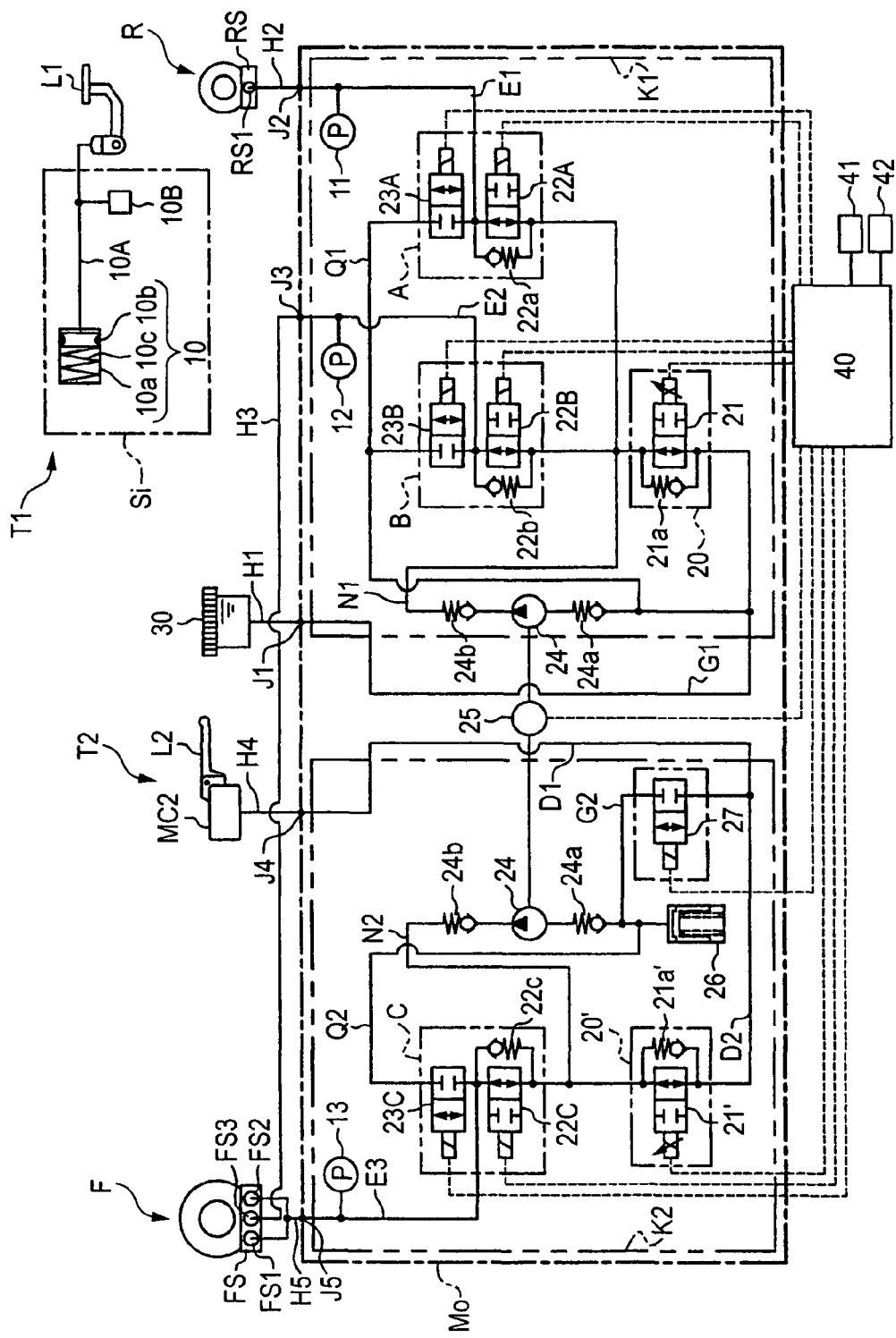
FIG. 2 is a view of a brake hydraulic pressure circuit applied to a vehicular brake hydraulic pressure control device according to the second embodiment of the present invention.

FIG. 2 is a view of a brake hydraulic pressure circuit applied to a vehicular brake hydraulic pressure control device according to the second embodiment of the present invention.

This embodiment is different from the above-described first embodiment in the points that a regulator 20' is provided at the output hydraulic pressure passage D2, the suction hydraulic pressure passage G2 is provided between the pump 24 and the output hydraulic pressure passage D2, and a suction valve 27 is provided at the suction hydraulic pressure passage G2. The other constitutions are the same.

The regulator 20' includes:

a function for switching the state of allowing flowing a brake fluid into the wheel hydraulic pressure passage E3 from the output hydraulic pressure passage D2 and the state of shutting-off flowing this brake fluid; and a function for adjusting brake hydraulic pressures of the wheel hydraulic pressure passage E3 and the discharge hydraulic pressure passage E3 to be a predetermined value or less when shutting-off flowing the brake fluid into the wheel hydraulic pressure passage E3 from the output hydraulic pressure passage D2.

The regulator 20' also includes a cut valve 21' and a check valve 21a'.

The cut valve 21' is a normally open type linear solenoid valve provided between the output hydraulic pressure passage D2 communicating to the master cylinder MC2 and the wheel hydraulic pressure passage E3 communicating to the wheel brake F. The cut valve 21' is for switching the state of allowing flowing a brake fluid into the wheel hydraulic pressure passage E3 from the output hydraulic pressure passage D2 and the state of shutting-off flowing this brake fluid. For example, the cut valve 21' is shut off (closes) at the time of pressure increasing or an interlocking brake based on an operation amount of the rear wheel side brake pedal L1, so as to shut-off directly transmitting the brake fluid, which flows from the master cylinder MC2, from the output hydraulic pressure passage D2 to the wheel hydraulic pressure passage D2. Thereby, the brake fluid is sucked into the pump 24 from the output hydraulic pressure passage D2 through the suction hydraulic pressure passage G2 (the suction valve 27).

The check valve 21a' is connected in parallel with the cut valve 21'. The check valve 21a' is for allowing flowing only a brake fluid into the wheel hydraulic pressure passage E3 from the output hydraulic pressure passage D2. The check valve 21a' allows flowing the brake fluid into the wheel hydraulic pressure passage E3 from the output hydraulic pressure passage D2 even if the cut valve 21' closes temporarily to be locked due to failure or the like.

The suction valve 27 is a normally open type electromagnetic valve provided at the suction hydraulic pressure passage G2, and is for switching the state of opening the suction hydraulic pressure passage G2 and the state of shutting off it. The suction valve 27 opens at the time of an interlocking brake or pressure increasing.

According to the vehicular brake hydraulic pressure control device of this embodiment, the front wheel side second brake system K2 includes the regulator 20' and the suction valve 27. Thus, for example, when the front wheel brake F is suddenly braked, the second brake system K2 can control to open the suction valve 27, close the cut valve 21, and operate the pump 24. Thereby, the sudden braking can be performed on the front wheel brake F.

Figure 3:
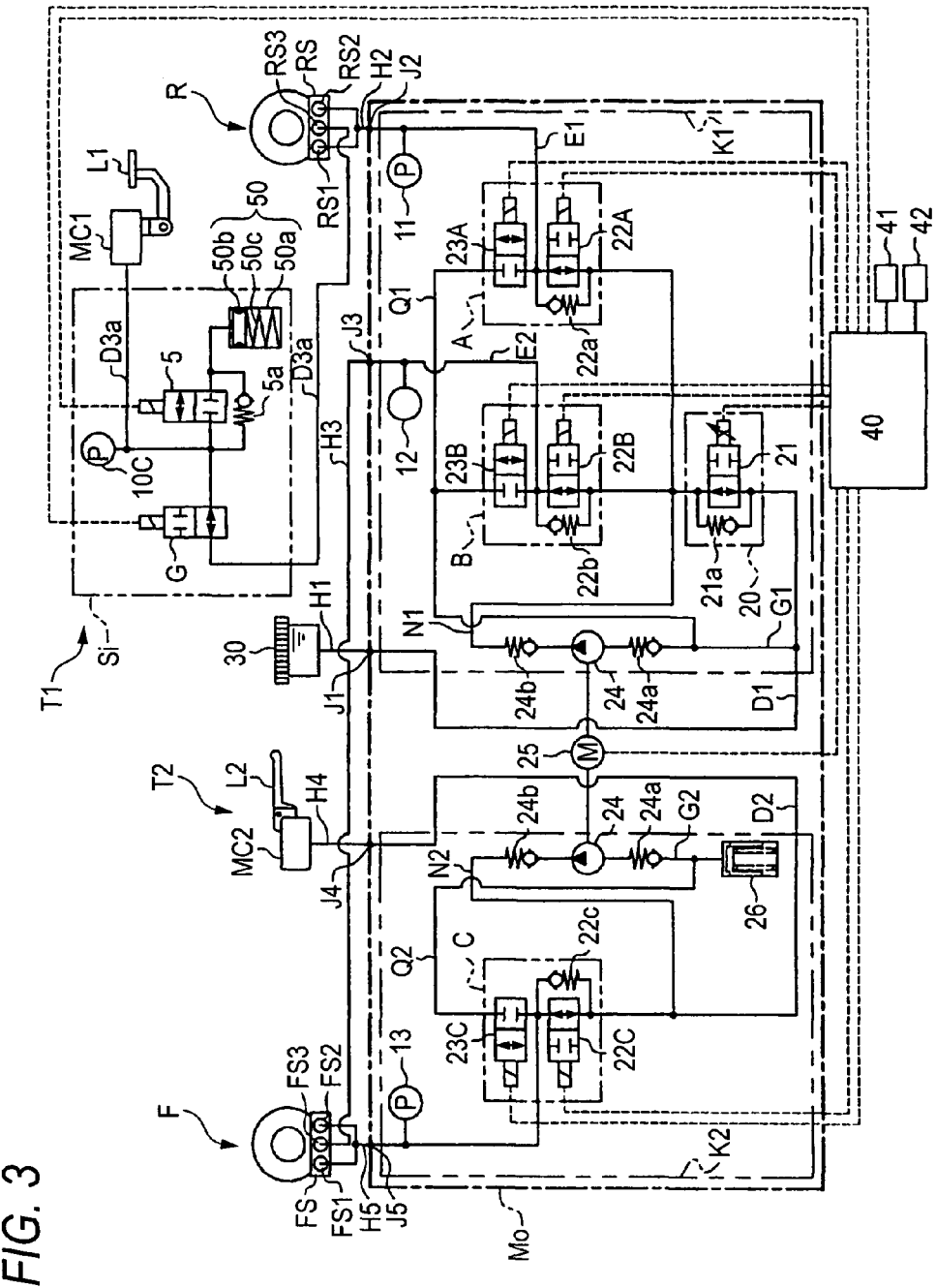
FIG. 3 is a view of a brake hydraulic pressure circuit applied to a vehicular brake hydraulic pressure control device according to the third embodiment of the present invention.

FIG. 3 is a view of a brake hydraulic pressure circuit applied to a vehicular brake hydraulic pressure control device according to the third embodiment of the present invention.

This embodiment is different from the above-described first and second embodiments in the points that braking force based on an operation amount of the brake pedal L1 is directly given to the rear wheel side wheel brake R even when an engine or the like is stopped or the control device 40 is stopped.

In the vehicular brake hydraulic pressure control device of this embodiment, the stroke simulator Si is operated by brake hydraulic pressure. The device detects the brake hydraulic pressure corresponding to operation force of the brake pedal L1, and performs brake controlling based on the measured value in the first brake system K1. Thereby, even when an engine or the like is stopped or the control device 40 is stopped, the brake pressure can directly work on the rear wheel side wheel brake R.

The stroke simulator Si includes a dummy cylinder 50, an opening/closing valve 5, a check valve 5a, a shutting-off valve 6, and a pressure detection sensor 10C.

Further, the rear wheel brake R includes a brake cylinder RS in which three cylinders RS1 to RS3 are separated each other so as to be enable to input a brake fluid from the stroke simulator Si side.

The dummy cylinder 50 includes a cylinder body 50a, a piston 50b slidably provided in the cylinder body 50a, and a spring 50c energizing the piston 50b. Further, the dummy cylinder 50 is connected to an output hydraulic pressure passage D3a through the opening/closing valve 5 and the shutting-off valve 6. As for the dummy cylinder 50, when the shutting-off valve 6 closes and the opening/closing valve 5 opens, a null stroke of the piston 50b allows flowing a brake fluid, which flows out from the master cylinder MC1 to the output hydraulic pressure passage D3a (the output flow passage), so as to give operation reaction force, which corresponds to the brake pedal L1, to the brake pedal L1. That is, when operation force is given to the brake pedal L1, fluid pressure in a fluid chamber of the dummy cylinder 50 of the stroke simulator Si is increased in accordance with pressure increasing of the master cylinder MC1. The piston 50b is displaced in the direction, in which the fluid chamber is expanded, up to the position at which an elastic force generated by the spring 50c is well balanced with the fluid pressure in the fluid chamber. Then, a brake fluid corresponding to an expansion amount of the fluid chamber flows into the fluid chamber from the output hydraulic pressure passage D3a so as to occur an operation stroke corresponding to a flowing amount of the brake fluid at the brake pedal L1. Thereby, operation feeling of the brake pedal L1 is kept, and the brake hydraulic pressure is detected by the pressure detection sensor 10C while keeping the operation feeling. The value by the pressure detection sensor 10C is inputted in the control device 40 so as to reflect the brake controlling in the first brake system K1.

The opening/closing valve 5 is a normally close type electromagnetic valve, and is communicated between the output hydraulic pressure passage D3a and the dummy cylinder 50 while operating an engine or a motor, which are not illustrated, in a normal operation. Further, when the not illustrated engine and motor are not operated, the opening/closing valve 5 closes between the output hydraulic pressure passage D3a and the dummy cylinder 50. The opening/closing valve 5 is connected in parallel with the check valve 5a. The check valve 5a is for allowing flowing only a brake fluid into the output hydraulic pressure passage D3a from the dummy cylinder 50. When inputting from the brake pedal L1 is released, the check valve 5a allows flowing the brake fluid into the output hydraulic pressure passage D3a from the dummy cylinder 50 side even when the opening/closing valve 5 closes.

The shutting-off valve 6 is for switching the state of allowing flowing a brake fluid into an output hydraulic pressure passage D3b (the output flow passage) from the output hydraulic pressure passage D3a, that is, the state of allowing flowing a brake fluid into the rear wheel brake R side from the master cylinder MC1 side and the state of shutting-off flowing this brake fluid. The shutting-off valve 6 is a normally open type electromagnetic valve provided between the output hydraulic pressure passage D3a and the output hydraulic pressure passage D3b.

In this embodiment, the shutting-off valve 6 is set to close at the time of starting operating the not illustrated engine and motor of a vehicle. That is, the shutting-off valve 6 shuts-off flowing the brake fluid into the output hydraulic pressure passage D3b from the output hydraulic pressure passage D3a when the engine and the like of a vehicle are driven. In addition, the shutting-off valve 6 certainly opens when the engine and the like are stopped or the control device 40 is stopped, so as to directly transmit operation force of the brake pedal L1 (that is, the brake hydraulic pressure occurred in the master cylinder MC1) to the wheel brake R.

In addition, as for the rear wheel brake R, a brake fluid from the wheel hydraulic pressure passage E1 of the first brake system K1 is inputted into the two main cylinders RS1 and RS2 among the three cylinders RS1 to RS3 of the brake cylinder RS. The brake fluid from the master cylinder MC1 is inputted into the remained sub cylinder RS3.

According to the vehicular brake hydraulic pressure control device of this embodiment, when the engine and the like are stopped or the control device 40 is stopped, the brake hydraulic pressure corresponding to an operation amount of the brake pedal L1 can work on the rear wheel brake R from the output hydraulic pressure passage D3*a* through the output hydraulic pressure passage D3*b*, and thus a fail safe function can be realized.

Accordingly, the embodiments of the present invention were described above, but the present invention is not restricted in the above-described embodiments, and can be properly deformed to be performed.

For example, the second brake system K2 can be formed to have a similar constitution to that of the first brake system K1. That is, the stroke simulator Si is connected to the brake lever L2, and the second brake system K2 can be controlled based on the value measured by the detection unit of the stroke simulator Si.

Further, although the first brake system K1 was used to a rear wheel side brake system, it can be used to a front wheel side brake system. Further, although the second brake system K2 was used to a front wheel side brake system, it can be used to a rear wheel side brake system.

Further, a discharging amount of the brake fluid in the pump 24 can be varied for every brake systems.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicular brake hydraulic pressure control device comprising:
    first operation unit that is provided with a first brake operation element;
    a first brake system that operates a first wheel brake in response to the first operation unit;
    a first control valve unit that is provided at the first brake system and controls brake hydraulic pressure in the first brake system;
    a second operation unit that is provided with a second brake operation element;
    a second brake system that operates a second wheel brake in response to the second operation unit; and
    a second control valve unit that is provided at the second brake system and controls brake hydraulic pressure in the second brake system,
    wherein the first operation unit and the first brake system are separated so as not to flow brake fluid therebetween, and
    wherein a brake fluid tank having a reservoir function is provided for supplying the brake fluid to the separated first brake system,
    wherein the first operation unit corresponding to the first brake system comprises:
        a stroke simulator that gives operation reaction force in response to the operation of the first brake operation element to the first brake operation element; and
        a detection unit that detects an operation amount of the first brake operation element, and
    wherein the first brake system comprises a pump that discharges the brake fluid to at least a first wheel hydraulic pressure passage communicating to the first wheel brake in order to correspond to the operation amount detected by the detection unit, and
    wherein the first control valve unit comprises:
        a first control member corresponding to the first wheel brake; and
        a second control member corresponding to the second wheel brake,
    wherein the first control member and the second control member communicate or shut off a first wheel hydraulic pressure passage communicating to the first wheel brake and a second wheel hydraulic pressure passage communicating to the second wheel brake to increase and retain the brake hydraulic pressure to the first and second wheel brakes, and returns the brake fluid in the respective first and second wheel hydraulic pressure passages to the suction hydraulic pressure passage of the pump to decrease the brake hydraulic pressure, and
    wherein the detection sensor comprises a stroke sensor or a load sensor connected to a rod, wherein the stroke sensor detects an operation amount or operation force of the first brake operation element that corresponds to the first brake system, and
    wherein the stroke simulator includes a dummy cylinder comprising:
        a cylinder body;
        a piston, which is slidably provided in the cylinder body and is pushed by the first brake operation element by the rod; and
        a spring,
        wherein when the first brake operation element is activated, reaction force and stroke corresponding to an operation amount of the first brake operation element are applied to the first brake operation element by spring force from the spring, and
    wherein the stroke simulator corresponding to the first brake system is for quasi-applying operation reaction force to a brake pedal (L1) in accordance with an operation amount or the operation force of the brake pedal (L1).

2. The vehicular brake hydraulic pressure control device according to claim 1, wherein the brake fluid tank is open to atmosphere.

3. The vehicular brake hydraulic pressure control device according to claim 1,
    wherein the brake fluid returned to a suction hydraulic pressure passage of the pump from the first wheel brake flows into the brake fluid tank.

4. The vehicular brake hydraulic pressure control device according to claim 1, wherein the second brake system comprises:
    a master cylinder;
    a cut valve that communicates or shuts off between the master cylinder and the second control valve unit; and
    a suction valve that communicates or shuts off between the master cylinder and the suction hydraulic pressure passage of the pump.

5. The vehicular brake hydraulic pressure control device according to claim 1,
    wherein the second wheel brake is operated by an input of the brake fluid from the first brake system and the second brake system, respectively.

6. The vehicular brake hydraulic pressure control device according to claim 1,
    wherein the first brake system is for a rear wheel side, and the second brake system is for a front wheel side.

7. The vehicular brake hydraulic pressure control device according to claim 1,
    wherein the first brake system is for a front wheel side, and the second brake system is for a rear wheel side.

8. The vehicular brake hydraulic pressure control device according to claim 1, wherein the first brake system controls the second wheel brake in accordance with the first operation unit provided with a brake pedal as the first brake operation element, and controls the second wheel brake interlocking with the first wheel brake.

9. The vehicular brake hydraulic pressure control device according to claim 8, wherein the second wheel brake employs a brake cylinder having a plurality of cylinders, the second wheel brake inputs a brake fluid from the second brake system to some of the cylinders, and also inputs the brake fluid from the first brake system to another of the cylinders as a sub input.

10. The vehicular brake hydraulic pressure control device according to claim 1, wherein the first brake system includes a flow passage from a first inlet port (J1) communicating to a brake fluid tank to a first outlet port (J2) and a flow passage from the first inlet port (J1) to a third outlet port (J3), the first outlet port (J2) is connected to the first wheel brake through a pipe (H2), and the third outlet port (J3) is connected to the second wheel brake through a first pipe (H3).

11. The vehicular brake hydraulic pressure control device according to claim 10, wherein the second brake system further includes a flow passage from a second inlet port (J4) to a fourth outlet port (J5), the second inlet port (J4) is connected to a master cylinder (MC2), through a second pipe (H4), and the fourth outlet port (J5) is connected to the second wheel brake through a third pipe (H5).

12. The vehicular brake hydraulic pressure control device according to claim 11, wherein:
the first brake system includes a wheel control valve unit and wheel interlocking control valve unit, and a regulator,
the regulator includes:
a function for switching states of allowing and shutting off flowing of brake fluid from an output hydraulic pressure passage (D1) to wheel hydraulic pressure passages (E1) and (E2) leading to the first wheel brake and the second wheel brake, respectively; and
a function for adjusting the brake hydraulic pressures in the wheel hydraulic pressure passages (E1) and (E2) and discharge hydraulic pressure passage (N1) associated with the first wheel brake to a predetermined value or less when flowing of the brake fluid into the wheel hydraulic pressure passages (E1) and (E2) is shut-off from the output hydraulic pressure passage (D1).

13. The vehicular brake hydraulic pressure control device according to claim 12, wherein the regulator further includes:
a cut valve and a check valve,
the cut valve is provided between the output hydraulic pressure passage (D1) and the wheel hydraulic pressure passages (E1) and (E2),
the cut valve is for switching states of allowing and shutting off flowing of the brake fluid from the output hydraulic pressure passage (D1) to the wheel hydraulic pressure passages (E1) and (E2),
in a normal state, the cut valve is opened so as to circulate the brake fluid to the discharge hydraulic pressure passage (N1) and flows into the wheel hydraulic pressure passages (E1) and (E2), to suction hydraulic pressure passage (G1),
the cut valve adjusts the brake hydraulic pressure by releasing the brake hydraulic pressure in the wheel pressure passages (E1) and (E2) to the suction hydraulic pressure passage (G1), by balancing the brake hydraulic pressure applied from the output hydraulic pressure passage (D1) to the regulator and force to close a valve controlled by current carried to a solenoid; and the check valve is connected in parallel with the cut valve, the check valve is a one-way valve which allows flowing the brake fluid from the output hydraulic pressure passage (D1) to the wheel hydraulic pressure passages (E1) and (E2).

14. The vehicular brake hydraulic pressure control device according to claim 13, wherein:
the wheel control valve unit has a function for changing:
a state of shutting off release passage (Q1) while releasing the wheel hydraulic pressure passage (E1);
a state of releasing the release passage (Q1) while shutting off the wheel hydraulic pressure passage (E1); and
a state of shutting off both of the wheel hydraulic pressure passage (E1) and the release passage (Q1).

15. The vehicular brake hydraulic pressure control device according to claim 14, wherein:
the wheel control valve unit includes an inlet valve, a check valve, and an outlet valve, wherein:
the inlet valve is a normally open type electromagnetic valve provided at the wheel hydraulic pressure passage (E1) and, in a normal state, the inlet valve opens so as to allow transmitting brake hydraulic pressure from a pump to the first wheel brake through the wheel hydraulic pressure passage (E1);
the inlet valve is closed by controlling of a control device when the second wheel brake is falling into locking state, so as to shut-off transmitting the brake hydraulic pressure from the pump to the second wheel brake through the wheel hydraulic pressure passage (E2),
the outlet valve is a normally close type electromagnetic valve provided between the wheel hydraulic pressure passage (E1) and the release passage (Q1);
when the first wheel brake is falling into locking state, the outlet valve is opened by controlling of the control device so as to release the brake hydraulic pressure which applies to the first wheel brake to the suction hydraulic pressure passage (G1) from the release passage (Q1),
thereby, the brake fluid released to the suction hydraulic pressure passage (G1) is returned to the brake fluid tank.

16. The vehicular brake hydraulic pressure control device according to claim 15, further comprising:
a first hydraulic pressure sensor for measuring a magnitude of the brake hydraulic pressure working on the first wheel brake, and is provided at the wheel hydraulic pressure passage (E1), wherein a value of the brake hydraulic pressure measured by the first hydraulic pressure sensor is taken into the control device which compares whether a magnitude of the brake fluid measured by the first hydraulic pressure sensor corresponds to an operation amount or operation force measured by the detection unit of the stroke simulator of the first operation unit, and the control device controls the first control valve unit and the wheel interlocking control valve unit for a front wheel so as to correspond the value measured by the first hydraulic pressure sensor to the value measured by the detection sensor; and
a second hydraulic pressure sensor for measuring a magnitude of brake fluid working on the second wheel brake, and is provided at the wheel hydraulic pressure passage (E2), a value of the brake fluid measured by the second hydraulic pressure sensor is taken into the control device so as to control an interlocking brake by comparing whether the magnitude of the brake fluid measured by the second hydraulic pressure sensor corresponds to an operation amount or operation force measured by the detection unit of the stroke simulator, the control device then controls the wheel interlocking control valve unit of the front brake so that a value measured by the second hydraulic pressure sensor corresponds to the value measured by the detection sensor.

* * * * *